Oct. 3, 1939.  H. KING  2,174,750
MACHINE FOR APPLYING PROTECTIVE HEADS TO NAILS
Filed Oct. 9, 1937  12 Sheets-Sheet 1

INVENTOR
Harry King
by his attorneys
Stebbins, Blenko & Parmelee

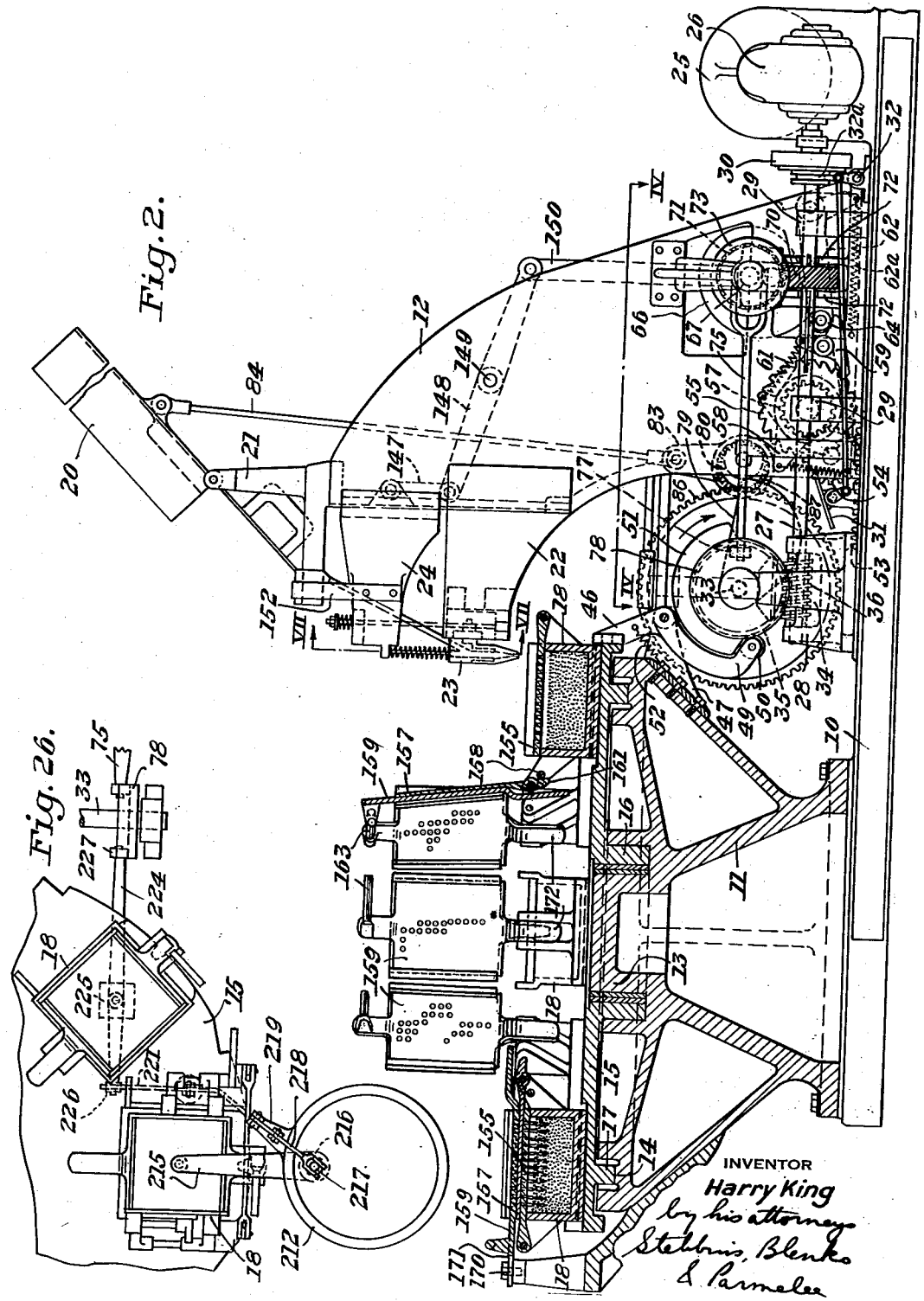

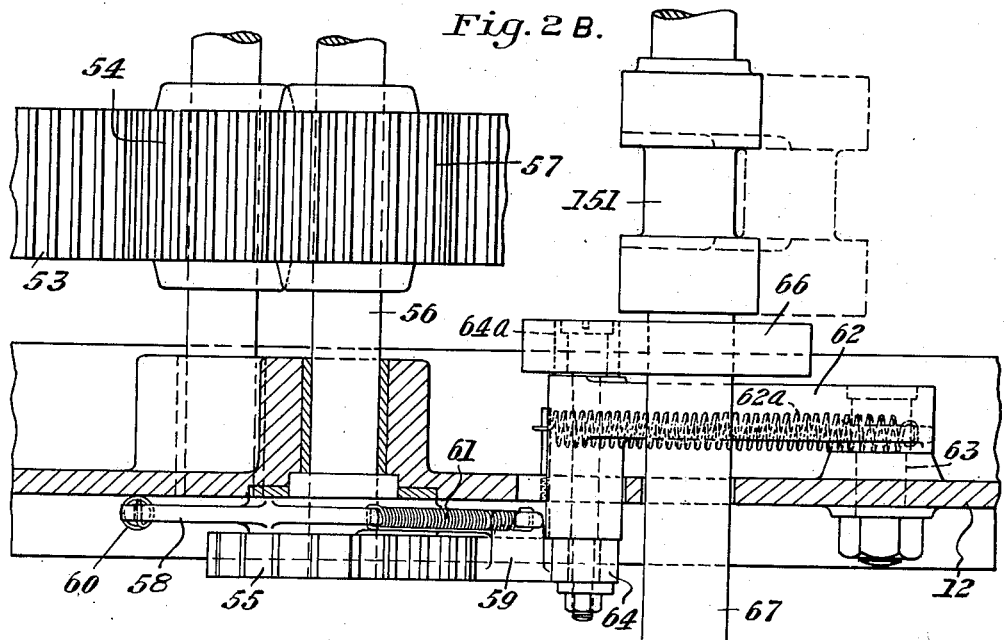

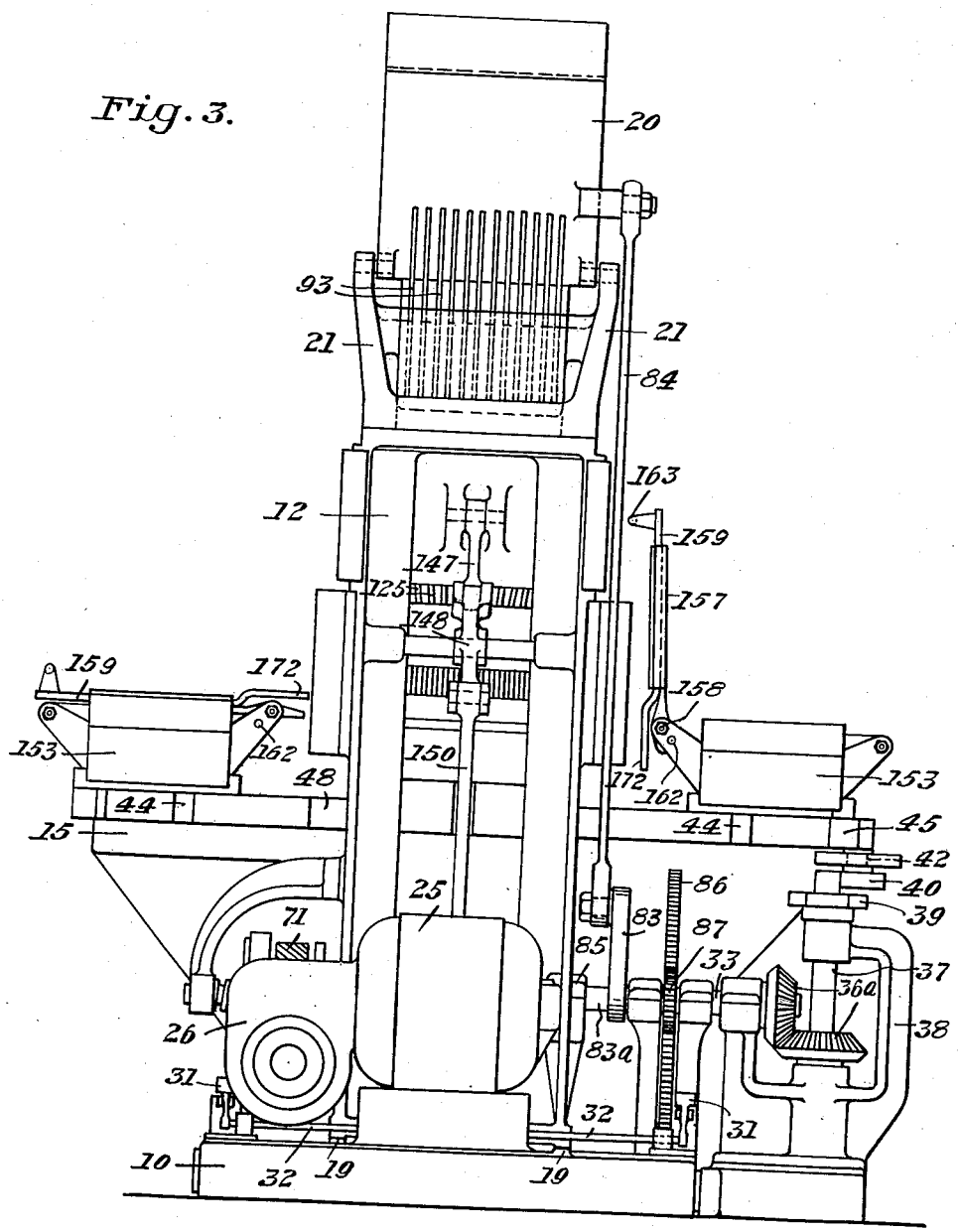

Oct. 3, 1939.  H. KING  2,174,750
MACHINE FOR APPLYING PROTECTIVE HEADS TO NAILS
Filed Oct. 9, 1937  12 Sheets-Sheet 5
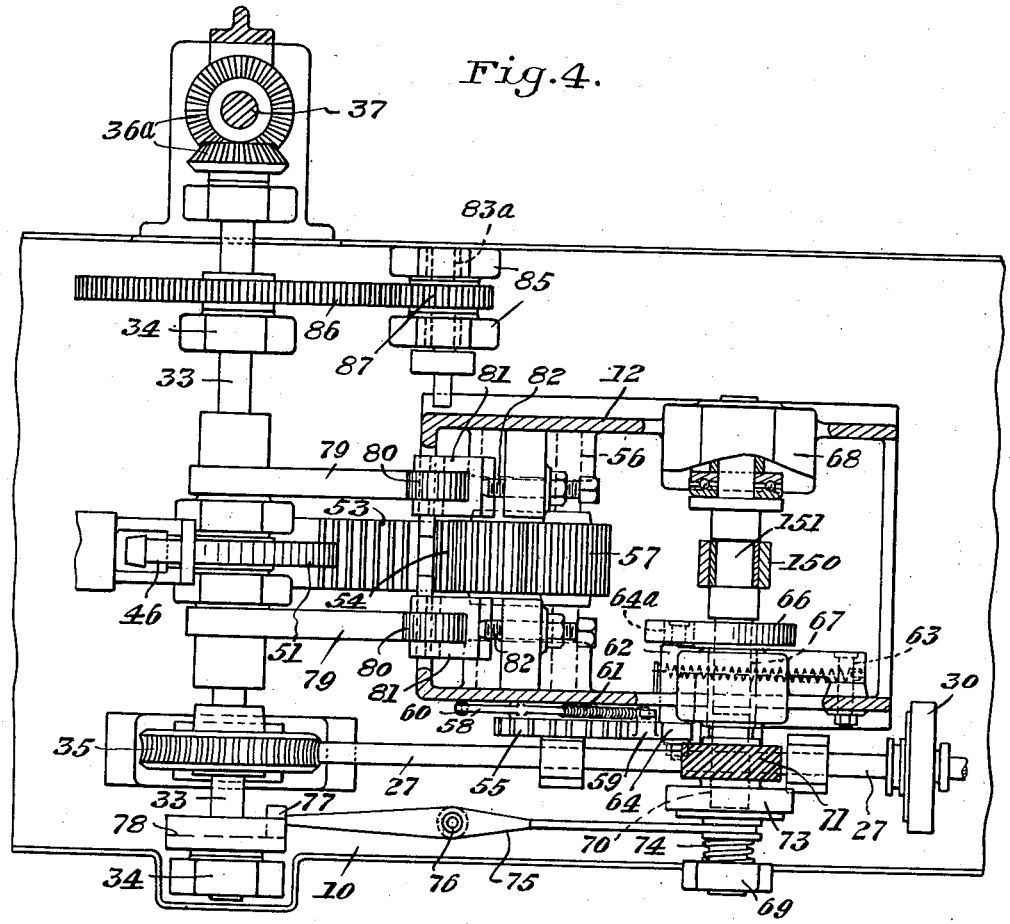
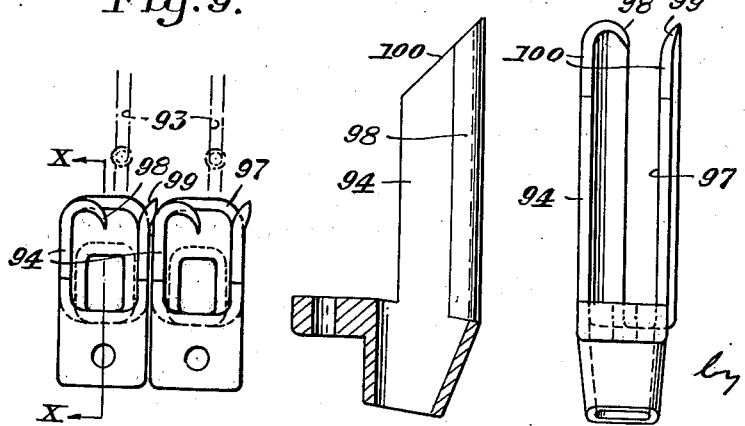
INVENTOR
*Harry King*
by his attorneys
*Stebbins, Blenko & Parmelee*

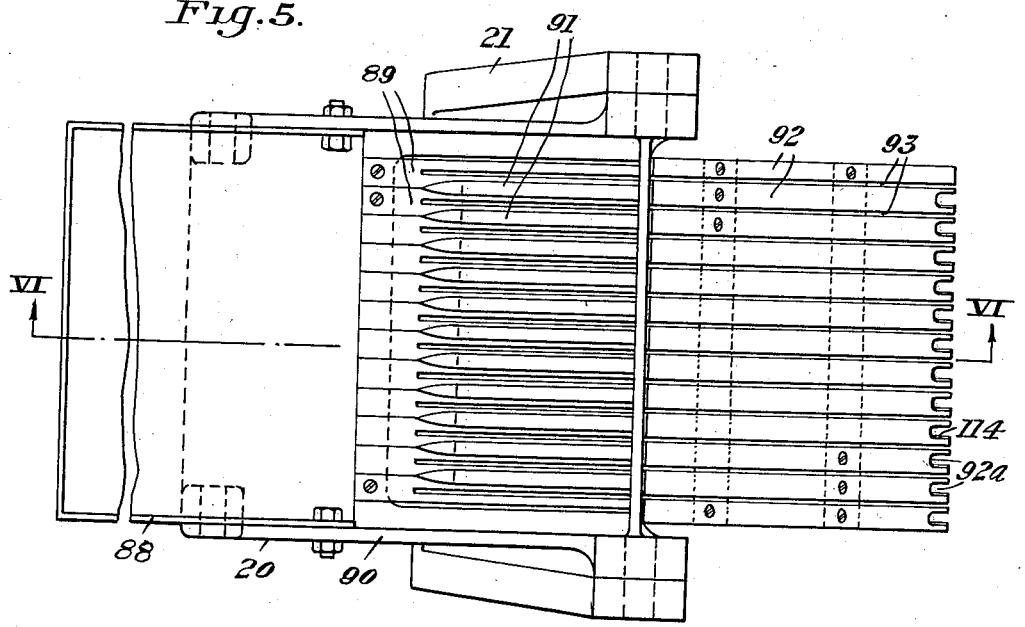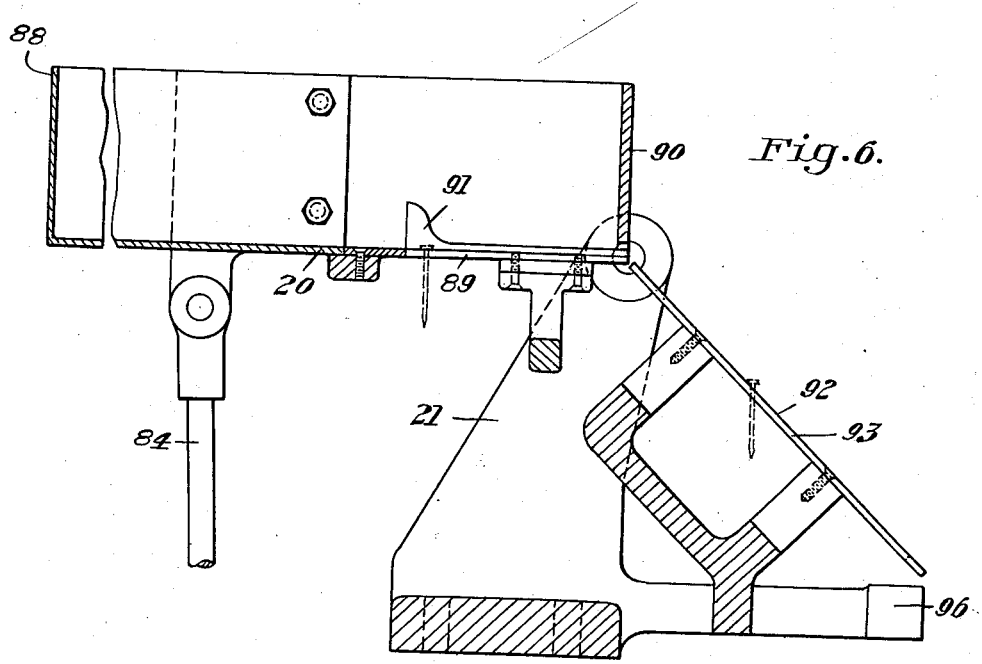

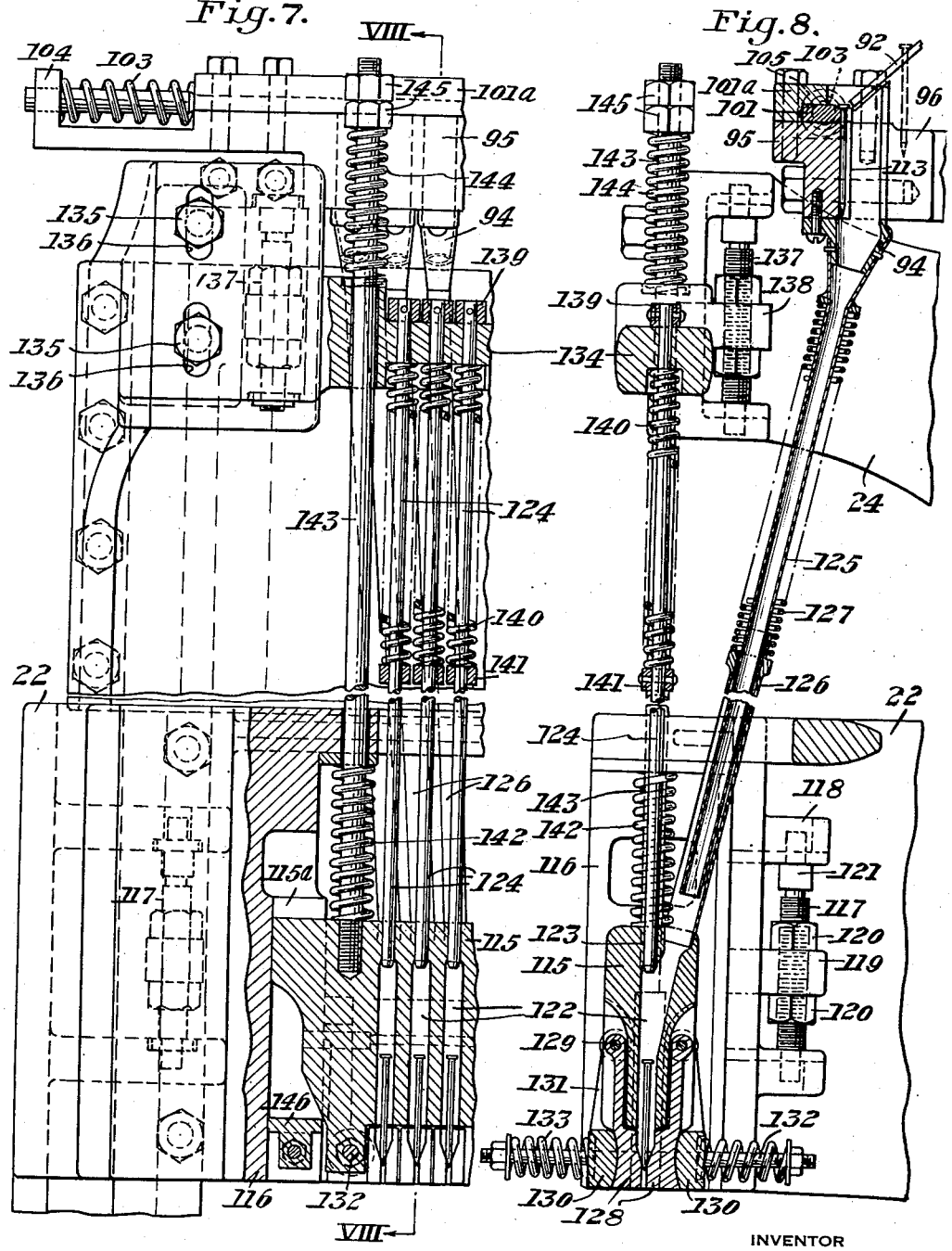

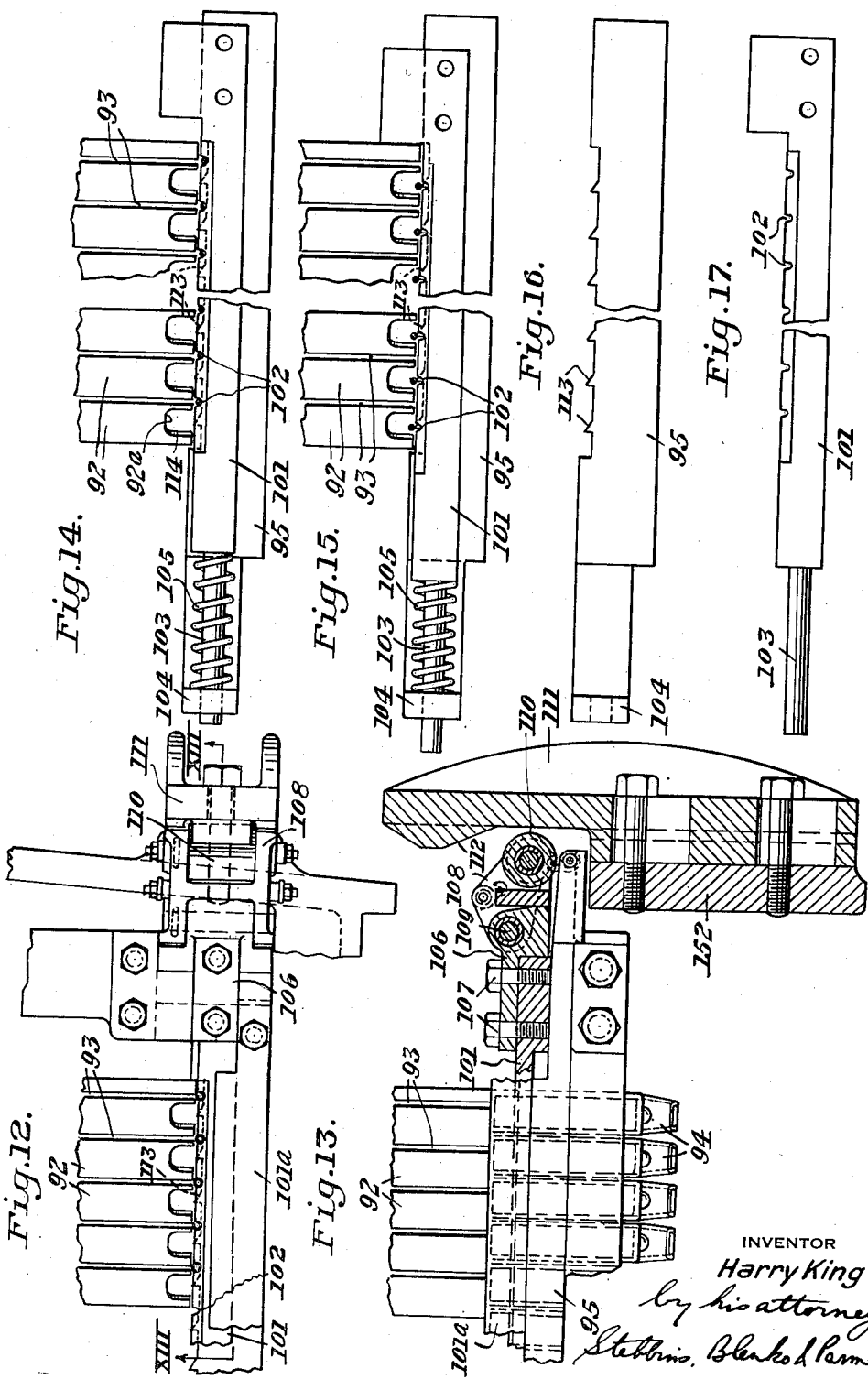

Oct. 3, 1939.  H. KING  2,174,750
MACHINE FOR APPLYING PROTECTIVE HEADS TO NAILS
Filed Oct. 9, 1937  12 Sheets-Sheet 9
Fig. 20.
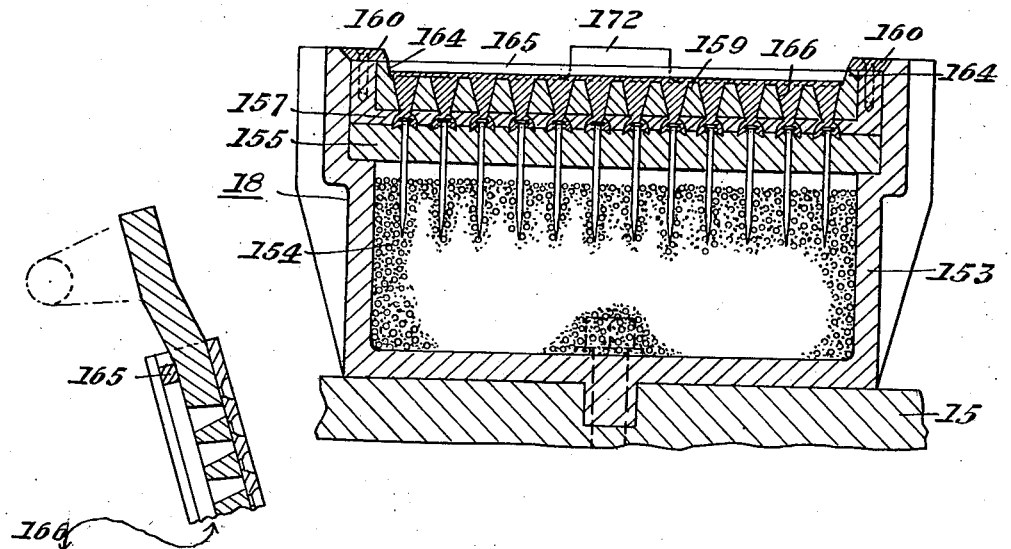
Fig. 21.
Fig. 18.
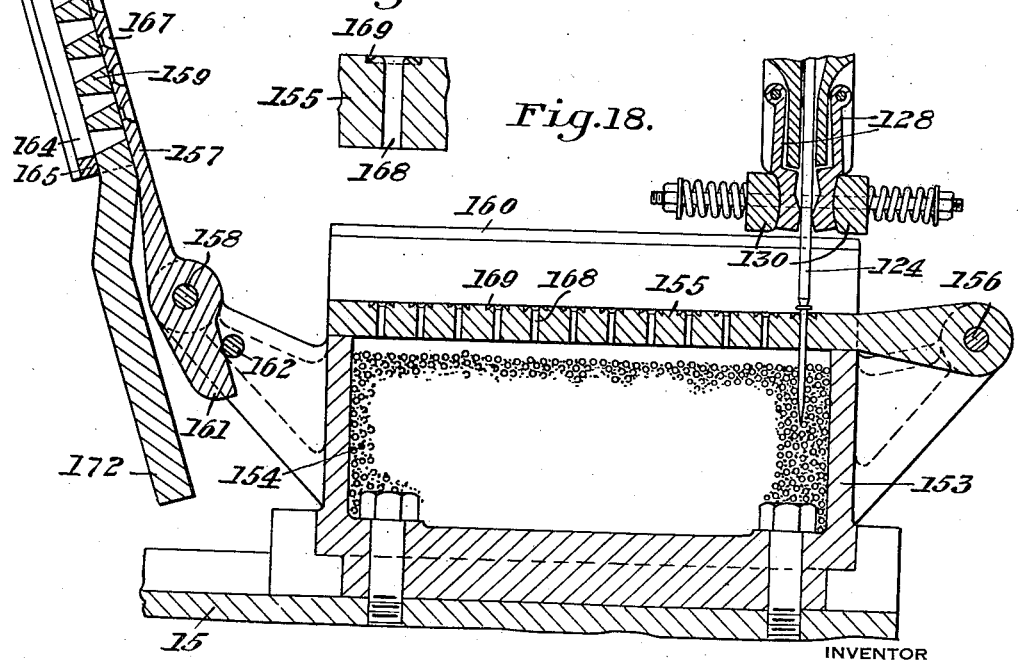
INVENTOR
Harry King
by his attorneys
Stebbins, Blenko & Parmelee Oct. 3, 1939.   H. KING   2,174,750
MACHINE FOR APPLYING PROTECTIVE HEADS TO NAILS
Filed Oct. 9, 1937   12 Sheets-Sheet 10
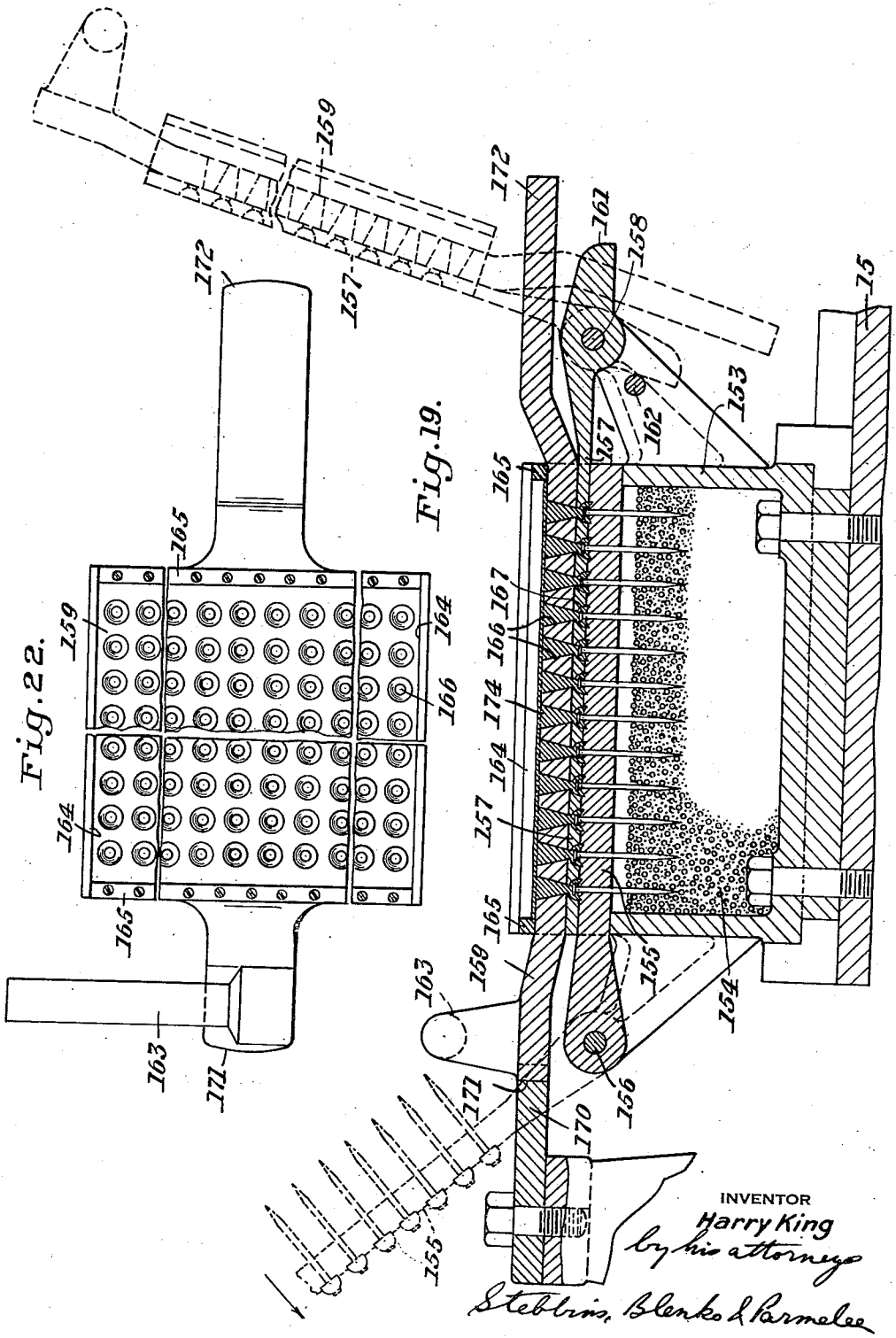
INVENTOR
Harry King
by his attorneys
Stebbins, Blenko & Parmelee Oct. 3, 1939.  H. KING  2,174,750
MACHINE FOR APPLYING PROTECTIVE HEADS TO NAILS
Filed Oct. 9, 1937  12 Sheets-Sheet 11

INVENTOR
Harry King
by his attorneys
Stebbins, Blenko & Parmelee

Oct. 3, 1939.  H. KING  2,174,750
MACHINE FOR APPLYING PROTECTIVE HEADS TO NAILS
Filed Oct. 9, 1937   12 Sheets-Sheet 12

INVENTOR
Harry King
by his attorneys
Stebbins, Blenko & Parmelee

Patented Oct. 3, 1939

2,174,750

UNITED STATES PATENT OFFICE 2,174,750

MACHINE FOR APPLYING PROTECTIVE HEADS TO NAILS

Harry King, Portsmouth, Ohio, assignor to Wheeling Steel Corporation, Wheeling, W. Va., a corporation of Delaware Application October 9, 1937, Serial No. 168,251

15 Claims. (Cl. 10—158)

This invention relates to a machine for applying protective heads to nails.

While machines of the general type contemplated by the invention have been proposed heretofore (Smith Patent No. 1,720,611) such machines have not, so far as I am aware, come into general use and the prevailing method of making nails having heads of protective material such as lead, is by hand. It is an object of my invention therefore, to provide a machine of the type mentioned which is sufficiently positive and precise in operation and sufficiently easy of maintenance to make it possible to dispense with the manufacture of nails with lead covered heads by hand.

In accordance with my invention I provide a plurality of molding pots in circumferentially spaced relation about the edge of a turn-table. I also provide means for inserting nails in the mold pots preparatory to receiving a layer of molten lead thereover to form heads on the nails. I further provide means for feeding nails to be provided with protective heads in proper order and position for insertion into the mold pots. I also provide a common automatic driving and control mechanism for insuring operation of the various parts at the proper times.

For a complete understanding of the invention reference is made to the accompanying drawings illustrating a present preferred embodiment, which are to be noted in connection with the following detailed description.

In the drawings:

Fig. 2 is a view partly in side elevation, with parts broken away, and partly in section along the line 2—2 of Fig. 1;

Fig. 2A is a partial side elevation to enlarged scale of a portion of the apparatus shown in Fig. 2;

Fig. 2B is a plan view corresponding to Fig. 2A;

Fig. 3 is an end view of the machine such as would be seen by looking thereon from the right in Figs. 1 and 2;

Fig. 4 is a partial sectional view along the line 4—4 of Fig. 2, with parts shown in plan;

Fig. 5 is a partial plan view showing the oscillating nail pan and the guide extended downwardly therefrom;

Fig. 6 is a partial sectional view along the line 6—6 of Fig. 5;

Fig. 7 is a partial sectional view along the line 7—7 of Fig. 2;

Fig. 8 is a partial sectional view along the line 8—8 of Fig. 7;

Fig. 9 is a partial plan view of the funnels positioned at the lower ends of the guides shown in Figs. 5 and 6;

Fig. 10 is a sectional view along the line 10—10 of Fig. 9;

Fig. 11 is a front elevation of a funnel such as would be seen by looking from the left in Fig. 10;

Fig. 12 is a partial plan view of the mechanism for discharging nails from the guides shown in Figs. 5 and 6 to the funnels shown in Figs. 9 to 11;

Fig. 13 is a sectional view along the line 13—13 of Fig. 12 showing parts in elevation;

Fig. 14 is a view similar to Fig. 12 with parts removed for clearness;

Fig. 15 is a view similar to Fig. 14 showing the parts in an alternative position;

Fig. 16 is a plan view of one of the members forming part of the mechanism in Figs. 14 and 15;

Fig. 17 is a plan view of another member of the mechanism of Figs. 14 and 15;

Fig. 18 is a sectional view through one of the molding pots and the nail feeding mechanism, taken along the line 18—18 of Fig. 1;

Fig. 19 is a partial sectional view to enlarged scale showing the molding pot which appears at the left in Fig. 2;

Fig. 20 is a sectional view through one of the molding pots taken along the line 20—20 of Fig. 1;

Fig. 21 is a partial sectional view taken through the lower mold plate of one of the molding pots;

Fig. 22 is a plan view of a shear plate forming part of each mold pot;

Fig. 26 is a plan view of a portion of the apparatus shown in Fig. 25.

General arrangement of the machine

Figure 1:
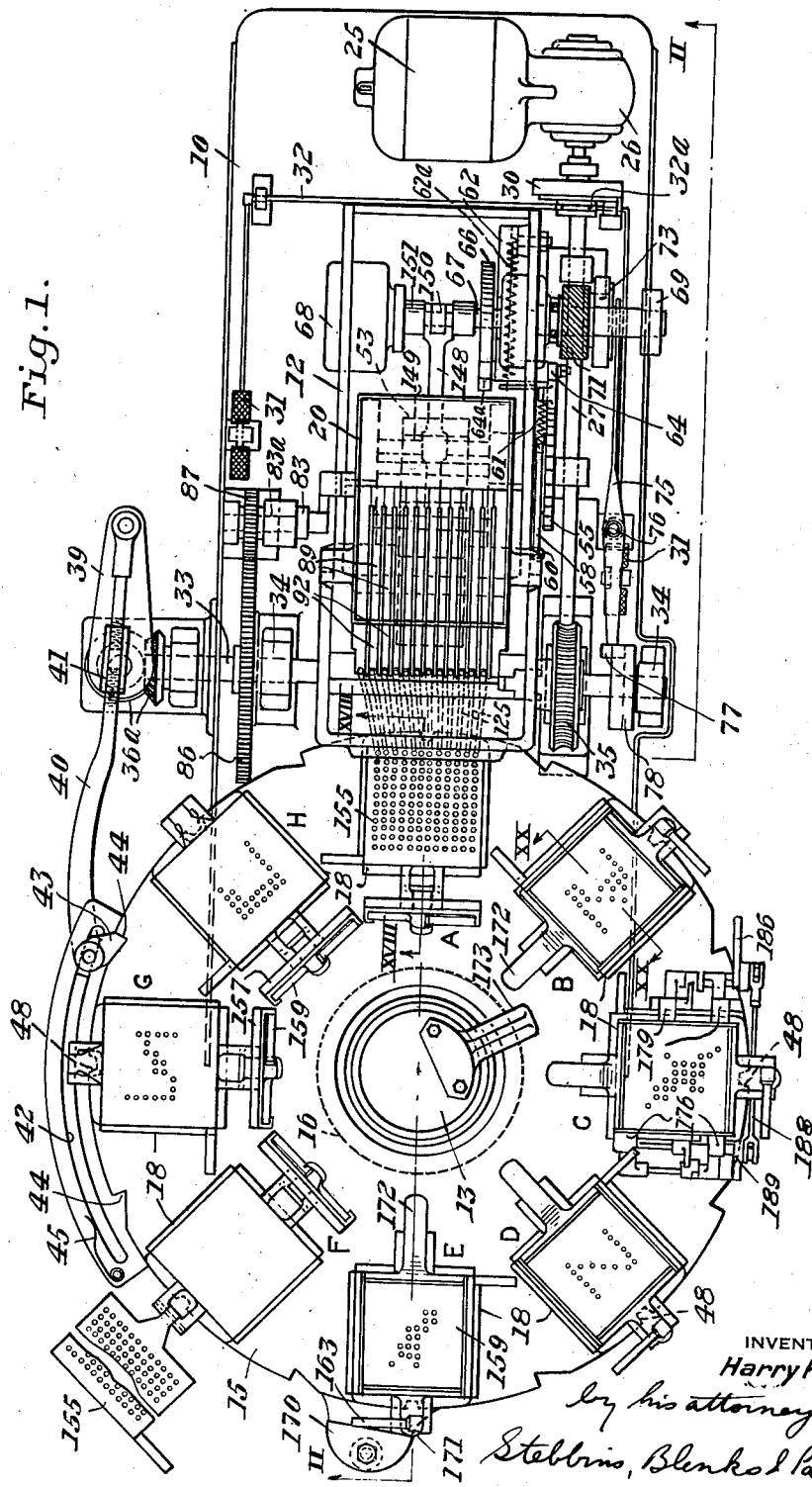
Fig. 1 is a plan view of the machine.

A bed plate 10 provides a support for a turn-table base 11 and a housing 12. The base 11 is fixed to the bed plate 10 and is provided with a pivot 13 and an annular track 14. A turn-table 15 has a hub 16 which fits down over the pivot 13 and an annular bearing 17 cooperating with the track 14. The table 15 is provided with a plurality of mold pots 18 adapted on rotation of the turn-table successively to occupy the various positions in which the mold pots are shown in Fig. 1.

The housing 12 is slidable on ways 19 formed on the bed plate. An oscillating nail pan 20 is pivoted to the top of the housing 12. A fixed head 22 on the housing 12 carries nail chucks 23 and a reciprocable head 24 slidable on the housing causes nails in the chucks to be fed to the mold pots.

The machine is driven by a motor 25 through reduction gearing 26. A shaft 27 journalled in bearings 28 and 29 on the bed plate is connected to the reduction gearing 26 through a clutch 30. Treadles 31 are disposed at convenient points and connected to a rock-shaft 32 provided with a clutch operating fork 32a whereby the machine may be stopped and started as desired while the motor continues to run.

Indexing mechanism

A cross shaft 33 is journalled in bearings 34 on the bed-plate. A worm wheel 35 on the shaft 33 is driven by a worm 36 on the shaft 27. Through bevel gears 36a the shaft 33 drives a vertical shaft 37 journalled in a bearing bracket 38 secured to the bed-plate. A crank 39 is secured to the shaft 37 at its upper end. An indexing lever 40 is pivoted to the crank 39. The lever 40 is composed of two separate parts connected by a tubular adjusting nut 41. The end of the lever 40 opposite that which is pivoted to the crank 39, reciprocates in an arcuate guide 42 carried on the turn-table base 11. A pawl 43 is pivoted to the lever 40 for cooperation with notches 44 spaced circumferentially of the turn-table 15. A spring 45 seats the pawl 43 successively in the notches 44 as the lever 40 reaches the rearward limit of its stroke. It will be clear from the foregoing description that rotation of the shaft 33 causes intermittent or step by step rotation of the table 15.

The table 15 is normally locked against rotation with one of the mold pots properly positioned under the nail chucks 23, by a pawl 46 pivoted on a bracket 47 secured to the base 11. The pawl 46 cooperates with notches 48 formed in the periphery of the table and has a depending lower end 49 provided with a roller 50 cooperating with a cam 51. The cam 51 is secured to the shaft 33 (see Fig. 4) and is so positioned thereon that the pawl 46 will be retracted just before the pawl 43 starts on its forward stroke to cause clockwise rotation of the table 15. A spring 52 resets the pawl 46 as soon as the high portion of the cam 51 has passed the roller 50. The cam 51 is so designed that this occurs after the table has been advanced to bring a mold pot into alignment with the nail chucks.

The mold pots have a plurality of rows of holes. The pots themselves will be described in detail shortly. The nails to be provided with molded heads are inserted in these rows of holes successively from the chucks 23. The mold pots are fixed on the turn-table and the housing 12 must therefore be advanced step by step to place the nail chucks in alignment successively with the several rows of holes in the mold pots. The means for advancing the housing 12 comprises a rack 53 secured to the bed plate and a pinion 54 journalled in the housing and meshing with the rack. A ratchet wheel 55 is secured to a shaft 56 journalled in the housing (see Fig. 4) and a gear 57 on the shaft 56 meshes with the pinion 54. A ratchet pawl arm 58 is rotatable on the shaft 56 and is provided with a pawl 59 pivoted thereon. A spring 60 tends to turn the arm 58 counter-clockwise and a spring 61 tends to cause the pawl 59 to leave the ratchet wheel 55. A bell crank 62 is pivoted at 63 to the housing and is provided with a roller 64 adapted to engage a cam surface or tail piece 65 on the pawl 59. A roller 64a on the crank 62 is maintained in engagement with a cam 66 by a spring 62a. The cam 66 is keyed to a shaft 67 journalled in bearings 68 and 69 on the housing. The shaft 67 is driven from the shaft 27 by helical gears 70 and 71. The gear 70 is splined to the shaft 27 and ears 72 projecting from the housing 12 about the shaft 27 cause the gear 70 to remain in proper position relative to the gear 71 as the housing 12 is advanced along the bed plate.

A clutch 73 is effective to place the gear 71 in driving relation with the shaft 67 or free it therefrom. The clutch is normally engaged by a spring 74. On releasing the clutch, therefore, the shaft 67 remains stationary even though the shaft 27 continues to rotate. A clutch shifting lever 75 is pivoted for rotation in a horizontal plane on a bearing 76 mounted on the bed plate 10. The end of the lever remote from the clutch has a follower 77 cooperating with a side cam 78 on the shaft 33. The function of the cam 78 is to disengage the clutch 73 and stop the shaft 67 when the housing 12 is to be restored to its illustrated position after successive forward steps.

It will be apparent from the description just given that when the clutch 73 is engaged, the shaft 67 will be driven. Clockwise rotation of the cam 66 will cause successive swinging of the bell crank 62, the latter causing the pawl 59 to engage the teeth of the ratchet wheel 55 and advance it one tooth pitch in the clockwise direction. As the high point of the cam 66 passes the roller 64a the pawl 59 is retracted from the ratchet wheel by the spring 61 and the arm 58 shifts counter-clockwise under the influence of the spring 60. The pawl 59 is thus retracted at all times except when it is actually causing clockwise movement of the ratchet wheel. Rotation of the latter causes advancement of the housing through the gear 57, the pinion 54 and the rack 53.

Cams 79 are secured to the shaft 33 and cooperate with rollers 80 journalled in bearings 81 adjustably mounted in the housing 12 and backed up by adjusting screws 82. The cams 79 are effective to restore the housing 12 to its illustrated position after advancement thereof. The cams 78 and 79 are so designed and positioned on the shaft 33 that they are effective successively to disengage the clutch 73 and start reverse movement of the housing 12 after the latter has been advanced to its extreme forward position.

The nail feeding mechanism

The nail pan 20 is oscillated or tilted up and down by a crank 83 and a pitman 84. The crank is secured to a shaft 83a journalled in bearings 85 on the bed plate. The shaft 83a is driven by the shaft 33 through a gear 86 on the shaft 33 and a pinion 87 on the shaft 83a.

As best shown in Figs. 5 and 6, the pan 20 includes an upper box-like portion 88 open at the lower end. Slotted guides 89 are positioned side by side on a casting 90 to which the box 88 is secured. Separators 91 are positioned between adjacent guides. Nails disposed in the box portion of the pan are fed on oscillation of the latter toward the guides 89. The action of the separators 91 is to cause the nails to fall through the slots in the guides point down and hang therein by their heads as shown in Fig. 6.

Nail slides 92 are secured to the bracket 21 in spaced relation as best shown in Figs. 5 and 6, to provide therebetween, slots 93 forming a continuation of those in the guides 89. The nails are thus fed from the pan 20 into the slots 93 and fall downwardly along the slides 92 as shown in Fig. 8 until they enter funnels 94 (see Figs. 9, 10, 11). The funnels 94 are secured to a guide block 95 carried by projections 96 extending forwardly from the bracket 21. The funnels 94, as shown in Figs. 9 and 11, are open at one side to permit the nail shanks to pass thereinto. One side of each funnel adjacent the vertical slot 97 therein is curved inwardly as shown at 98 to assist in confining the nail within the funnel. The other side of the entrance slot is bent outwardly, as shown at 99, to form a tapering throat for receiving the nail shank. The upper ends of the funnels are bevelled, as at 100, whereby they fit up closely under the slides 92.

As the nails leave the slides 92 they engage a nail sliding bar 101 having notches 102 in an edge thereof, which are normally in alignment with the slots 93 between the slides 92. The bar 101 slides within a guide 101a. As shown in Figs. 7, 14 and 15, the left hand end of the bar 101 is turned down as at 103 and is slidable in a bearing 104 at the adjacent end of the guide block 95. A compression spring 105 urges the bar 101 toward the right. The right hand end of the bar 101 is provided with a pivot block 106 secured thereto by screws 107. A bracket 108 is pivoted to the block 106 on a pin 109 and is provided with a roller 110. The roller 110 is so positioned as to be engaged by an actuator 111 having an inclined surface 112 thereon. The means for reciprocating the actuator will be described shortly. On downward movement of the actuator the inclined surface 112 thereof engages the roller 110 on the bracket 108 and forces the bar 101 to the left. On upward movement of the actuator, the bracket 108 swings counter-clockwise until the inclined surface 112 has passed beyond the roller 110.

Leftward movement of the bar 101 shifts the nails which have been seated in the slots 102 thereof, as shown in Figs. 14 and 15. The guide block 95 is provided with spaced inclined surfaces 113 effective on leftward movement of the bar 101 to push the nails laterally to free them from suspension by their heads in the slots 102. The lower ends of the slides 92 are recessed as at 92a to permit the nails to fall freely into the funnels 94, as shown in Fig. 8. The left hand sides of the recesses 92a are bevelled off as at 114 to prevent the heads of the nails from catching thereon.

Referring now particularly to Figs. 7 and 8, a nail setting head 115 is slidable vertically in ways 115a formed in a slide 116. The slide 116 is mounted for vertical adjustment between the side brackets of the head 22. The guide may be adjusted relative to the brackets 22 by means of screws 117 journalled in suitable bearings 118 in the brackets and threaded into lugs 119 extending rearwardly from the guide. Lock nuts 120 serve to hold the screws in adjusted position. The screws 117 have a square portion 121 to receive a wrench.

The nail setting head has a plurality of bores 122 substantially vertically thereof. Adjacent the top of each bore is a bearing 123 having a push rod 124 slidable therein. Telescoping tubes 125 and 126 extend from the funnels 94 to the tops of the bores 122 for delivering nails to the head 115. Springs 127 tend to keep the telescoping tubes extended as far as permitted by the relative positions of the head 115 and the guide block 95. The push rods 124 are reciprocated by means to be described shortly to eject nails from the head 115. Jaws 128 are pivoted to the head 115 at 129 and are urged together by spring bars 130 pivoted to the head on the same axis as the jaws 128 by arms 131. Spring pins 132 extend through slots in the bars 130 and are provided with compression springs 133 which urge the bars toward each other thus closing the jaws 128.

The reciprocable head 24 (see Fig. 2) is a sliding bifurcated bracket gibbed to the housing 12. A driving head 134 is secured to the spaced ends of the bracket 22 by screws 135 traversing slots 136 in the ends of the head. By means of the slots 136 the head is adjustable relative to the bracket. Adjustment is accomplished by the screw 137 journalled in bearings in the bracket 24 and threaded through a lug 138 on the head, in about the same manner as the nail setting head 115 is adjustable on the bracket 22. The upper ends of the push rods 124 extend through the driving head 134 and are provided with set collars 139. Compression springs 140 are disposed on the push rods between the driving head 134 and set collars 141. Thus on lowering of the bracket 24 the rods 124 are forced downward by the compression springs 140.

The nail setting head 115 is yieldably held in position by springs 142 disposed on guide rods 143. The rods 143 extend through aligned bores in the driving head 134 and the bifurcated ends of the bracket 22 and are threaded into the nail setting head 115. Compression springs 144 are disposed on the rods 143 between the driving head 134 and nuts 145 threaded on the upper ends of the rods. By means of this mounting the nail setting head 115 is resiliently supported in the guide 116. Downward movement of the head 115 is limited by stops 146 positioned in the ways 115a.

As best shown in Fig. 2, the bracket or head 24 is reciprocated by a link 147 pivoted thereto and to a lever 148. The latter is rotatable on a shaft 149 journalled in the housing 12. The lever is oscillated by a pitman 150 and a crank 151 secured to the shaft 67 (see Figs. 2A and 2B).

The bracket 24 carries an arm 152 extending upwardly therefrom as shown in Fig. 2. This arm carries the actuator 111 (see Figs. 12 and 13) which causes reciprocation of the nail sliding bar 101.

It will be apparent from the preceding description that nails fed downwardly along the slots 93 are discharged at intervals into the funnels 94 from which they pass through the tubes 125 and 126 into the bores 122 of the nail setting head 115. The nails lodging in the bores 122 are periodically ejected between the jaws 128 by the push rods 124. The nails so ejected are guided by the jaws into the holes of a mold pot below the nail setting head, details of which pot will now be explained.

The mold pots

Referring now particularly to Figs. 18 through 22, each mold pot 18 comprises a pot proper 153 secured to the table 15. The pot is filled with sand and shot as indicated at 154 to provide an easily penetrable bed for receiving the nails, as shown in Fig. 19, and supporting them in proper position relative to the other parts of the mold. The latter include a bottom mold plate 155 pivoted to the pot at 156 and having a handle 155a, an upper mold plate 157 pivoted to the pot at 158 and a shear plate 159 gibbed to the upper mold plate 157 for sliding movement therealong. The gibs holding the shear plate in position are shown at 160. The upper mold plate 157 has a tail piece 161 adapted to engage a stop 162 extending between the ears which provide bearings for the pin 158. The shear plate 159 has a handle 163 thereon whereby it may be manually tilted to the position shown in Fig. 19 in dotted lines, with the tail piece 161 engaging the stop 162. With the upper mold plate and the shear plate in the dotted line position, nails are inserted in the holes in the lower mold plate by operation of the nail feeding mechanism already described. As indicated in Fig. 18, the upper mold plate and shear plate are then restored to the solid line position shown in Fig. 19 and lead or suitable molten material is poured into the pot. The molten material is confined between the sides of the shear plate, indicated at 164, and end stops 165 secured to the shear plate. The shear plate has tapered holes 166 therein adapted to be aligned with the molding recesses 167 formed in the upper mold plate 157. The lower mold plate has holes 168 and recesses 169 therein. When the mold plates and shear plate are positioned as shown in Fig. 19 the pouring of molten material over the latter causes a lead coating or cap to be molded around the heads of the nails. When the molded caps have solidified sliding movement of the shear plate 159 severs the sprues filling the holes 166 from the caps on the nail heads. This movement of the shear plate is effected automatically by an abutment 170 having an inclined surface, carried on the turn table base 11 and adapted to cooperate with a lug 171 projecting from the shear plate. The handle 163 extends upwardly from this lug.

Figure 23:
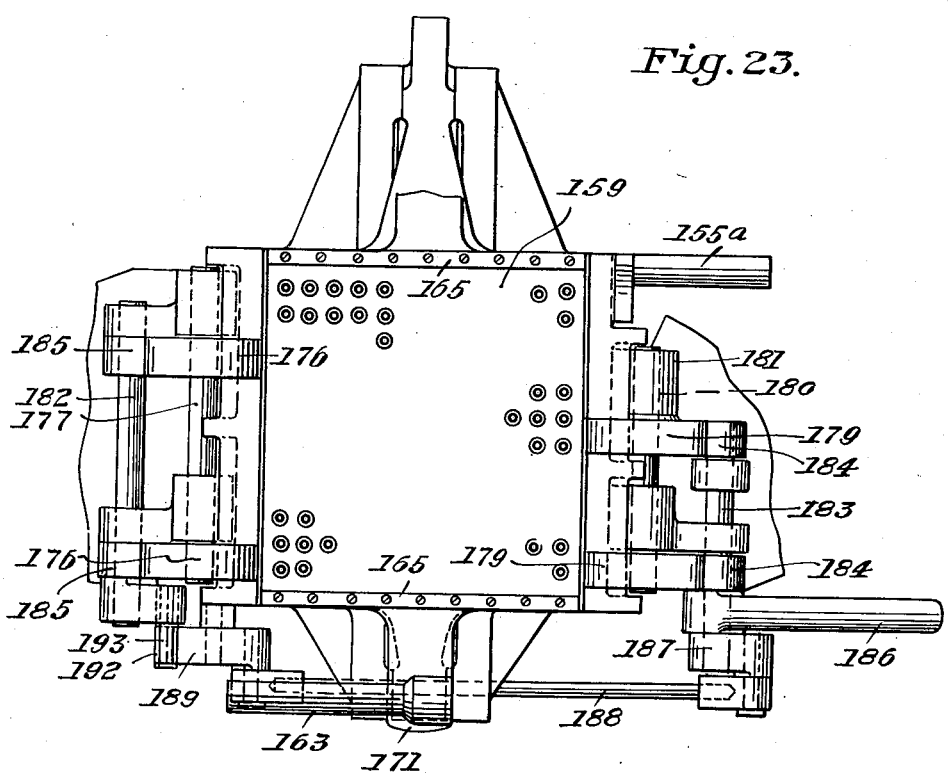
Fig. 23 is a plan view of a mold pot showing a clamping mechanism therefor.
Figure 24:
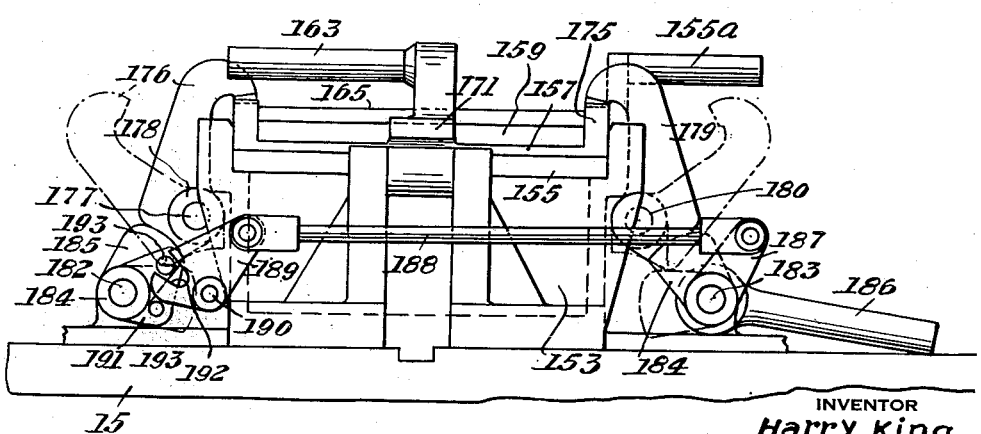
Fig. 24 is a side elevation corresponding to Fig. 23.

I provide means for clamping the upper mold plate 157 on the lower mold plate 155 while pouring, to prevent the protective material from spreading therebetween and to insure that heads of the proper shape are formed on the nails. The clamping mechanism is shown in Figs. 23 and 24. The upper mold plate 157 is provided with side flanges 175. As shown in Fig. 24, the shear plate 159 is reciprocable between these flanges. Clamps 176 are pivoted on a shaft 177 journalled in bearings 178 at the left hand side of the mold plot 153, shown in Fig. 23. The upper ends of the clamps are formed to hook shape for engagement with one of the side flanges 175. A similar clamp 179 is carried on a shaft 180 journalled in bearings 181 on the other side of the pot. Cam shafts 182 and 183 are journalled on opposite sides of the pot in bearings 184 secured to the table 15. Cams 185 on the cam shafts cooperate with the lower portions of the clamps 176 and 179 to move them from the dotted line positions shown in Fig. 24 to the positions shown in solid lines.

An operating lever 186 is secured to the shaft 183. A crank 187 is also secured to this shaft and is connected by a link 188 to a bell crank 189 on the opposite side of the pot pivoted thereto at 190. The bell crank 189 has pivotal connection with a crank plate 191 carried by the shaft 182. This connection is afforded by a slot 192 in the bell crank and pins 193 carried by the crank plate 191.

It will be apparent that the counter-clockwise movement of the lever 186 will cause the clamps 176 and 179 to be released from the side flanges 175 of the upper mold plate 157 and retracted to the dotted line positions shown in Fig. 24. Conversely clockwise movement of the lever 186 causes the clamps to engage the upper mold plate and hold it firmly against the lower mold plate.

*The operation of the machine*

Assuming that the parts occupy positions shown in Figs. 1, 2 and 3, the machine may be started by engaging the clutch 30. As before stated, the motor 25 may be operated continuously. As soon as the clutch 30 is engaged the shaft 27 is driven. This drives the shaft 33 clockwise. Oscillation of the nail pan 20 is effected through the gear 86 and the pinion 87. Oscillation of the pan 20 causes nails to be fed downwardly therefrom through the slots 93. These slots are normally filled with nails and as soon as one batch of nails is discharged from the lower ends of the slides 92, additional nails are fed into the upper ends thereof by the guides 89 and separators 91.

The shaft 67 is driven by the gears 70 and 71 since the clutch 73 is normally engaged. The rotation of the shaft 67 causes reciprocation of the head or bracket 24. The actuator 111 carried thereby causes longitudinal movement of the slide bar 101. This feeds nails from the slots 93 into the funnels 94. The downward movement of the bracket 24 actuates the push rods 124 to drive nails previously delivered to the nail setting head 115 between the jaws 126 of the latter and into the holes 168 in the bottom mold plate 155 of the mold pot 18 which is at the loading station A in Fig. 1.

On reverse movement of the bracket 24 the high portion of the cam 66 forces the roller 64 on the bell crank 62 downward thus setting the pawl 59 and advancing the ratchet wheel 55 one notch. This turns shaft 56 clockwise and through gear 57, pinion 54 and rack 53 causing the housing 12 to advance the distance between adjacent rows of holes in the plates of the mold pot. The rotation of shaft 33 which occurs before the initial advancement of the housing 12 causes cams 79 to move away from their follower rollers 80 so that advancement of the housing is possible.

The operations described above are repeated until all the rows of holes in the mold pot have been filled with nails. The shot and sand in the body of the pot hold the nails in proper position with their heads slightly above the level of the top of the lower mold plate 155.

By the time the housing 12 has advanced to a point such that the nail setting head is in alignment with the inner row of holes in the mold plates and nails have been inserted in the latter, the high portion of the side cam 78 has engaged its follower roller 77 to disengage the clutch 73 thus stopping the shaft 67. At the same time the high portion of the cam 51 has advanced into engagement with its follower roller 50 to tilt the pawl 46 so that it moves out of the slot 48 in the rim of the turn table 15. The cams 79 are in position to engage their rollers 80 in the foremost position of the latter, for moving the housing backward to its original position. This takes place as rotation of the shaft 33 continues. Since the pawl 59 is normally out of engagement with the ratchet wheel 55, it does not prevent retraction of the housing as described.

During the loading operation, the vertical shaft 37 is driven by the bevel gears 36a and the crank 39 is actuated clockwise and the lever 40 and pawl 43 are shifted toward the left hand end of the guide 42. The pawl 43 enters the succeeding notch 44 on the table rim as the reverse movement of the housing commences. During this movement of the housing, the table 15 is advanced bringing an empty mold pot into position A and moving the loaded pot into position B.

Cams 51, 78 and 79 have returned to their illustrated positions by the time the reverse movement of the housing 12 and the partial rotation of the table 15 have been completed. The table is thus locked into position by the pawl 46 and the clutch 73 is re-engaged. Rotation of shaft 67 is thus resumed and the loading operation proceeds as described above. When a loaded pot has advanced to position B, the operator lowers the upper mold plate 157 and the shear plate 159 onto the lower mold plate 155. The shear plate has a tail piece 172 adapted to be engaged by an abutment 173 extending upwardly from the table base 11 whereby the shear plate is moved so that its holes are in alignment with those of the mold plates. This engagement occurs as a loaded pot moves from position B to position C in the course of the operations already outlined. At any convenient time before the mold pot reaches position C, the operator throws the lever 186 to cause clamps 176 and 179 to engage the side flanges 175 of the upper mold plate 157 and press it firmly against the lower mold plate 155. When a mold pot reaches position C molten metal is poured into it as shown at 174 in Fig. 19. This may be done manually or automatically, as will be described hereafter. The metal runs down the holes in the shear plate forming sprues and around and under the heads of the nails.

After pouring the molten metal, the operation of the machine continues until the pot passes through position D and position E. The metal sets during this period. As the loaded pot advances from position E to position F, the shear plate 159 is shifted along the upper mold plate by the engagement of lug 171 with the abutment 170. This relative movement causes the sprues 174 to be sheared from the caps formed around the nail heads. An operator then tilts the upper mold plate and shear plate to the dotted line position of Fig. 19, after releasing the clamps 176 and 179. The lower mold plate is likewise tilted in the opposite direction to dump out the finished nails. It is then restored to its normal position so as to be ready for reloading after the pot has passed through positions G and H and again returned to position A. As the upper mold plate and shear plate are tilted the excess metal lodged thereon is removed for remelting.

A slight modification of the apparatus described above is shown in Figs. 25 and 26. The following description of the latter will refer only to those portions thereof which have not already been described in detail. Those features which have been mentioned are referred to by reference numerals used above.

Figure 25:
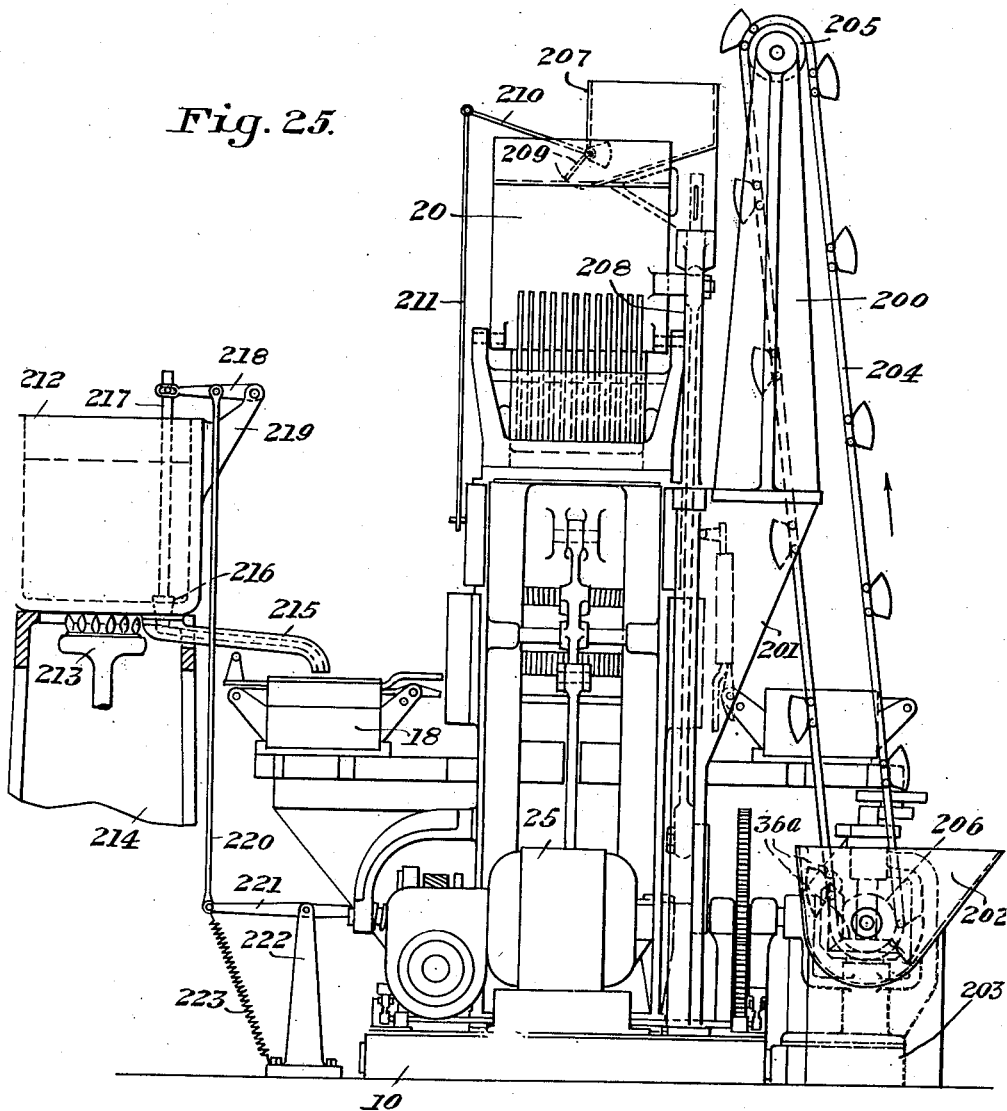
Fig. 25 is a view similar to Fig. 3 showing certain modifications of the structure of the latter.

Referring particularly to Fig. 25, a standard 200 is mounted on a post 201 extending upwardly from the base 10. A nail hopper 202 is carried on any suitable type of support 203 adjacent the base. A chain and bucket elevator 204 is trained over suitable sprockets 205 carried on the standard 200 and a shaft 206 journalled in the hopper 202. The latter is driven by a bevel gear meshing with the bevel gear on the shaft 37. Nails delivered into the hopper 202 are thus raised to a level above the shaker pan 20 and discharged into a hopper 207 carried on a pedestal 208 extending upwardly from the post 201. The hopper 207 is provided with a gate 209 pivoted on a horizontal axis for controlling the flow of nails from the hopper 207 into the shaker pan 20. A crank arm 210 secured to the gate, and a link 211 pivoted to the crank arm permit the operator to shift the gate so as to control the rate of flow of nails.

Figs. 25 and 26 show a form of apparatus for automatically pouring the protective material into the mold pots at the proper time. As shown in these figures, protective material in a pot 212 is maintained molten by a burner 213, or other suitable heating means. A pot is supported on a base 214 above the level of the top of the mold pots 18 and is provided with a pouring spout 215 terminating about the center of a mold pot at position C. The flow of protective material from the pot 212 through the spout and into the mold pot is controlled by a plug valve 216 carried on a stem 217. A crank 218 pivoted on a bearing 219 carried on the pot is pivotally connected to the stem 216. A link 220 is pivoted to the crank 218 for operating the plug valve. The link 220 is pivoted to a lever 221 mounted on a post 222 and having a spring return 223. The end of the lever 221 opposite that to which the link 220 is pivoted has a down-turned camming portion (not shown). A cam lever 224 is pivoted on a bearing 225 for angular movement in a horizontal plane and is provided with a roller 226 engaging the down-turned camming portion of the lever 221. Counter-clockwise movement of the lever 224 thus causes the link 220 to be raised and the valve 216 to be opened. The cam lever 224 has a follower roller 227 cooperating with cam 78 on shaft 33. The cam 78 is effective to cause counter-clockwise movement of the lever 224 when the housing has been restored to starting position and the table 15 advanced to dispose a loaded mold pot in position C. The valve 216 will be designed to permit the flow of molten protective material into the mold pot at a rate such that the latter will be properly filled by the time the cam 78 has turned through half a revolution to effect a resetting of the housing after successive advancement thereof in the loading operation.

It will be clear from the foregoing description that the invention provides a highly useful machine for casting caps around nail heads which reduces to a minimum the manual labor involved in such operation. The output per operator is substantially greater than that of a single workman using the methods now being practised and the cost of the product is correspondingly reduced. The construction of the machine is relatively simple considering the number and character of the automatic operations involved and this minimizes the maintenance problem. Means for adjusting the parts relative to one another have been provided where such adjustment is desirable. The invention also contributes to an improved quality and high degree of uniformity in the product itself.

The automatic delivery of nails to the shaker pan and the automatic pouring of the molten protective material into the mold pots reduces the number of necessary manual operations and insures continuous production.

It will be understood that while I have illustrated and described but one preferred embodiment of the invention, changes herein may be made without departing from the spirit thereof or the scope of the appended claims.

I claim:

1. In a machine for applying a protective cap to nail heads, a turntable having thereon a plurality of mold pots provided with means for receiving and supporting nail shanks, a housing adjacent said turntable and movable relative thereto, nail feeding means carried by said housing and adapted to deliver nails to said first mentioned means, means for actuating said nail feeding means, means for moving said housing relative to said turntable, and a common drive for said two last mentioned means.

2. In a machine for applying a protective cap to nail heads, a turntable having thereon a plurality of mold pots provided with means for receiving and supporting nail shanks, a housing adjacent said turntable and movable relative thereto, nail feeding means carried by said housing and adapted to deliver nails to said first mentioned means, means for effecting step by step rotation of said turntable, means for moving said housing relative to said turntable and a common drive for said two last mentioned means.

3. In a machine for applying a protective cap to nail heads, a turntable having therein a plurality of mold pots provided with means for receiving and supporting nail shanks, a housing adjacent said turntable, a plate on each of said pots having spaced holes for receiving nail shanks, a housing movable relative to the turntable, nail feeding means on the housing adapted to deposit nails in said holes, means for actuating the nail feeding means, and means for advancing it into alinement with said holes successively.

4. In a machine for applying a protective cap to nail heads, a turntable having thereon a plurality of mold pots provided with means for receiving and supporting nail shanks, a housing adjacent said turntable, a plate on each of said pots having spaced holes for receiving nail shanks, a housing movable relative to the turntable, nail feeding means on the housing adapted to deposit nails in said holes, means for actuating the nail feeding means, means for advancing it into alinement with said holes successively, means for retracting said housing after cooperation with all said holes, and means effective simultaneously to cause a partial rotation of the turntable to bring another pot into nail receiving position relative to said feeding means.

5. In a machine for applying a protective cap to nail heads, a turntable having thereon a plurality of mold pots, a plate on each of said pots having spaced holes for receiving nail shanks, a housing movable relative to the turntable, nail feeding means on the housing adapted to deposit nails in said holes, means for actuating the nail feeding means, means for advancing it into alinement with said holes successively, means for retracting said housing after cooperation with all said holes, and means for interrupting operation of said actuating and advancing means during retraction of the housing.

6. In a nail feeder including a sloping nail guide, means for feeding nails to the upper end thereof, and means for discharging nails singly from the lower end of the guide, a nail receiving funnel disposed adjacent said discharge means, the funnel having a slot to admit the shank of a nail descending said guide, one side of said slot being curved inward to prevent escape of the nail through said slot as it falls through the funnel.

7. The combination with a turntable having a mold pot thereon including a nail receiving plate and a shear plate movable relative thereto, of means effective on rotation of said turntable for shifting said shear plate.

8. The combination with a mold pot including a plate having a plurality of rows of nail receiving holes, of a nail setting head adapted to insert nails in the holes of said rows successively, and means for advancing said head from one row to the next between successive nail-inserting operations thereof.

9. A mold pot for holding nails while protective caps are cast on the heads thereof, comprising a pot proper, a bottom mold plate pivoted thereto, an upper mold plate also pivoted thereto and clamps mounted on said pot for engagement with the upper mold plate and effective to hold the latter firmly against the botom mold plate.

10. A mold pot for holding nails while protective caps are cast on the heads thereof, comprising a pot proper, a bottom mold plate pivoted thereto, an upper mold plate also pivoted thereto and clamps pivoted on opposite sides of said pot for engagement with the upper mold plate and effective to hold the latter firmly agaiint the bottom mold plate.

11. A mold pot for holding nails while protective caps are cast on the heads thereof, comprising a pot proper, a bottom mold plate pivoted thereto, an upper mold plate also pivoted thereto, clamps pivoted on opposite sides of said pot for engagement with the upper mold plate and effective to hold the latter firmly against the bottom mold plate and manually operable means for actuating said clamps simultaneously.

12. In a machine for applying a protective cap to nail heads, a turntable having thereon a plurality of mold pots spaced circumferentially thereof and each provided with mean for receiving and supporting nail shanks in a plurality of spaced rows, a housing adjacent said turntable, and nail feeding means carried by said housing and means for successively positioning said housing to deliver nails to the several rows of said first mentioned means individually.

13. In a machine for applying a protective cap to nail heads, a turntable having thereon a plurality of mold pots provided with means for receiving and supporting nail shanks, a housing adjacent said turntable, means for moving said housing progressively relative to a mold pot alined therewith, and nail feeding means carried by said housing and adapted to deliver nails to said first mentioned means in the several positions of said housing relative to said pot.

14. In a machine for applying a protective cap to nail heads, a turntable having thereon a plurality of mold pots provided with means for receiving and supporting nail shanks, a housing adjacent said turntable, means for moving said housing successively to a plurality of positions relative to a mold pot alined therewith, nail feeding means carried by said housing and adapted to deliver nails to said first mentioned means, and common drive means for actuating said nail feeding means and said housing moving means relative to said turntable in a predetermined time sequence.

15. In a machine for applying a protective cap to nail heads, a turntable having thereon a plurality of mold pots spaced circumferentially thereof, a plate on each of said pots having a plurality of rows of spaced holes for receiving nail shanks, a housing adjacent the turntable, nail feeding means on the housing adapted to deposit nails in the holes of said rows successively, and means for moving said housing into successive positions in which said feeding means alines with said rows.

HARRY KING.